United States Patent [19]

Strum et al.

[11] Patent Number: 4,872,940

[45] Date of Patent: Oct. 10, 1989

[54] APPARATUS FOR THE CONTINUOUS WELDING OF STRIPS AND/OR SHEETS

[75] Inventors: Josep Strum, Duisburg; Wilfried Prange, Dinslaken, both of Fed. Rep. of Germany

[73] Assignee: Thyssen Stahl Aktiengesellschaft, Duisburg, Fed. Rep. of Germany

[21] Appl. No.: 218,711

[22] Filed: Jul. 13, 1988

[30] Foreign Application Priority Data

Jul. 17, 1987 [DE] Fed. Rep. of Germany ....... 3723611

[51] Int. Cl.⁴ ..................... B23K 26/02; B23K 26/08; B23K 26/14
[52] U.S. Cl. .............................. 156/379.8; 156/272.8; 156/304.6; 156/379.9; 156/380.9; 156/544; 219/121.63; 219/121.81; 219/121.82; 219/121.84; 425/174.4
[58] Field of Search ............... 156/272.8, 275.1, 379.8, 156/379.9, 379.6, 272.2, 304.1, 304.6, 380.9, 507, 544, 324, DIG. 80, 504; 219/121.63, 121.64, 121.65, 121.66, 121.78, 121.81, 121.82, 121.84; 425/174.4

[56] References Cited

U.S. PATENT DOCUMENTS

| | | | |
|---|---|---|---|
| 2,958,367 | 11/1960 | Gournelle | 156/380.9 X |
| 4,152,573 | 5/1979 | Saurin et al. | 219/121.63 |
| 4,237,363 | 12/1980 | Lemelson | 219/121.64 X |
| 4,713,519 | 12/1987 | Bersch et al. | 219/121.63 |
| 4,733,815 | 3/1988 | Sturm | 219/121.64 X |

FOREIGN PATENT DOCUMENTS

| | | |
|---|---|---|
| 2708040 | 4/1979 | Fed. Rep. of Germany . |
| 3407417 | 9/1985 | Fed. Rep. of Germany . |
| 0106684 | 6/1985 | Japan .............................. 219/121.64 |
| 0249690 | 11/1986 | Japan .............................. 219/121.64 |
| 8403059 | 8/1984 | World Int. Prop. O. . |

OTHER PUBLICATIONS

Patent Abstracts of Japan, HBand 9, Nr. 256 (M-421)[1979], 15. Oct. 1985; & JP-A-60 106 684 (Kogyo Gijutsuin) 12.06.1985.

*Primary Examiner*—Michael W. Ball
*Assistant Examiner*—David W. Herb
*Attorney, Agent, or Firm*—Sprung Horn Kramer & Woods

[57] ABSTRACT

The invention relates to an apparatus for the continuous butt welding of strips and sheets by laser beams. The sheets or strips 1,2 are moved together in abutment and retained in the same level by tension rollers 3,4 on both sides and right and left of the welding gap. On at least one side of the strips or sheets the tension roller 3 comprises a hollow shaft 9,10 and roller shells 13, 14 pivotably mounted thereon. Both the hollow shaft 9,10 and the roller shells 13, 14 are formed with an aperture 18a, 18b through which the laser beam 25 of a welding head 19 disposed inside the hollow shaft 9,10 extends. The welding head 19 is so aligned that the focused laser beams 25 impinges through the apertures 18a, 18b in the hollow shaft 9,10 and the roller shells 13,14 on to the welding gap in the clamped zone of the strips or sheets 1,2.

10 Claims, 6 Drawing Sheets

APPARATUS FOR THE CONTINUOUS WELDING OF STRIPS AND/OR SHEETS

BACKGROUND OF THE INVENTION

1. Field of the Invention

The invention relates to an apparatus for the continuous welding of abutting strips or sheets by means of a fixed laser beam, having disposed in pairs on both sides of the strips or sheets to be welded tension rollers extending perpendicularly to the direction of travel of the strips or sheets.

For the longitudinal seam welding of sheets or strips using a fixed welding device, the sheets or strips to be welded must be so guided that their edges abut one another, to allow problem-free welding. In the case of flexible sheets or strips it is difficult to bring their edges into abutment for welding without the sheets or strips overlapping one another, and to clamp them firmly abutted at least at the weld point.

2. Background Information

In U.S. Pat. No. 4,733,815, relating to the continuous welding of abutting strips, the welding device takes the form of a laser beam welding device and is disposed, viewed in the direction of travel of the strips, downstream of large-dimension tension rollers, in the zone of a group narrow guide rollers of substantially smaller diameter. In that device the welding head is disposed at a distance from the strips to be welded corresponding to the diameter of the guide rollers.

One difficulty in the continuous welding of abutting strips and sheets is the welding seam may develop irregularities and faults due to the fact that the strip or sheet edges abutting at the weld point arch in places and therefore do not lie flat one against the other. Such faults occur more particularly in the laser beam welding of thin strips and sheets with a small clamping surface, since due to arching the edges may move out of the zone of the laser beam weld spot—i.e., the zone of maximum energy transmission. The strips or sheets cannot be clamped close enough to the laser beam weld point by means of the aforementioned small-diameter guide rollers.

SUMMARY OF THE INVENTION

It is therefore an object of the invention to provide a device for the continuous welding of strips or sheets moving in abutment, which enables a uniform, even weld seam to be produced even with thin strips or sheets.

To this end, in an apparatus of the kind specified according to the invention the tension rollers consist of hollow shafts and roller shells mounted thereon spaced out at an axial distance from one another, and each welding head of the laser beam welding device is disposed inside the hollow shaft of at least one tension roller, the laser beam passing through the gap between the roller shells and an opening in the hollow shaft. When a number of parallel weld seams are produced simultaneously, a number of tension rollers having laser welding devices can be provided, a common roller shell being used between each pair of adjacent weld seams.

In the apparatus according to the invention the strip or sheet edges to be welded are acted upon by the laser beam weld spot in the zone clamped by the tension rollers. Due to the clamping of the sheets or strips by stable, large rollers, the sheet or strip edges cannot arch, nor can they be distorted in the welding zone. The diameter of the tension rollers can be adapted to the size of the laser welding device used, more particularly to the focal width of the laser optical system.

In principle the two roller shells can be disposed on a continuous hollow shaft. In that case an aperture through which the laser beam passes is provided in the hollow shaft on the side adjacent the strip to be welded. However, preferably according to the invention in the zone of the gap between the roller shells, the hollow shaft is divided, the gap opened thereby between the two parts of the hollow shaft forming the opening through which the laser beam passes.

As a rule it is enough for one welding head to be provided in one of the two opposite tension rollers. However, more particularly if the thick sheets or strips are to be welded, with regard to the energy required conveniently either at least one welding head is disposed in each of the tension rollers disposed on both sides of the strips or sheets and/or a number of welding heads are disposed offset in relation to one another in the direction of strip or sheet travel in a tension roller disposed on one side of the strip or sheet. However, care must be taken that the laser beam of each welding head is directed at the clamped zone. According to one feature of the invention the tension rollers can be vertically adjustably mounted, to be able to clamp, for example, plates of different thicknesses. If in this embodiment the hollow shaft is also subdivided conveniently the tension rollers are mounted by their hollow shafts on independently movable rockers.

The hallow shaft of one tension roller can also receive a tube for supplying inert gas to a nozzle from which the inert gas is directed to the welding gap. Conversely, a pipe for the removal of the welding vapours can also be provided in one hollow shaft.

In laser beam welding the laser beam is of course produced in a resonator, conducted to the welding strip or sheet and focused into as small a weld spot is possible, in order to transmit the maximum energy to the material to be welded. To allow the optimum transmission of energy from the laser beam to the material to be welded, when strips or sheets of different thicknesses are welded it is advantageous if the laser beam weld spot can be adjusted in height and position to the material to be welded. For this purpose according to another feature of the invention the welding head of the laser welding device is so guided inside the hollow shaft of one tension roller by means of a manipulator arm that the welding head can move in all three coordinate axes. This is more particularly advantageous if two sheets or strips of different thicknesses are to be welded to one another, since in that case the laser beam can be conducted not perpendicularly, but at a given angle into the welding gap. The welding head can be given optimum alignment in relation to the welding gap via a control drive, by means of a sensor disposed in the direction of strip or sheet travel upstream of the tension rollers to determine the position of the welding gap.

DESCRIPTION OF AN EMBODIMENT OF THE INVENTION

An embodiment of the invention will now be described in greater detail with reference to the drawings.

DETAILED DESCRIPTION OF THE EMBODIMENT OF THE INVENTION

Figure 1:
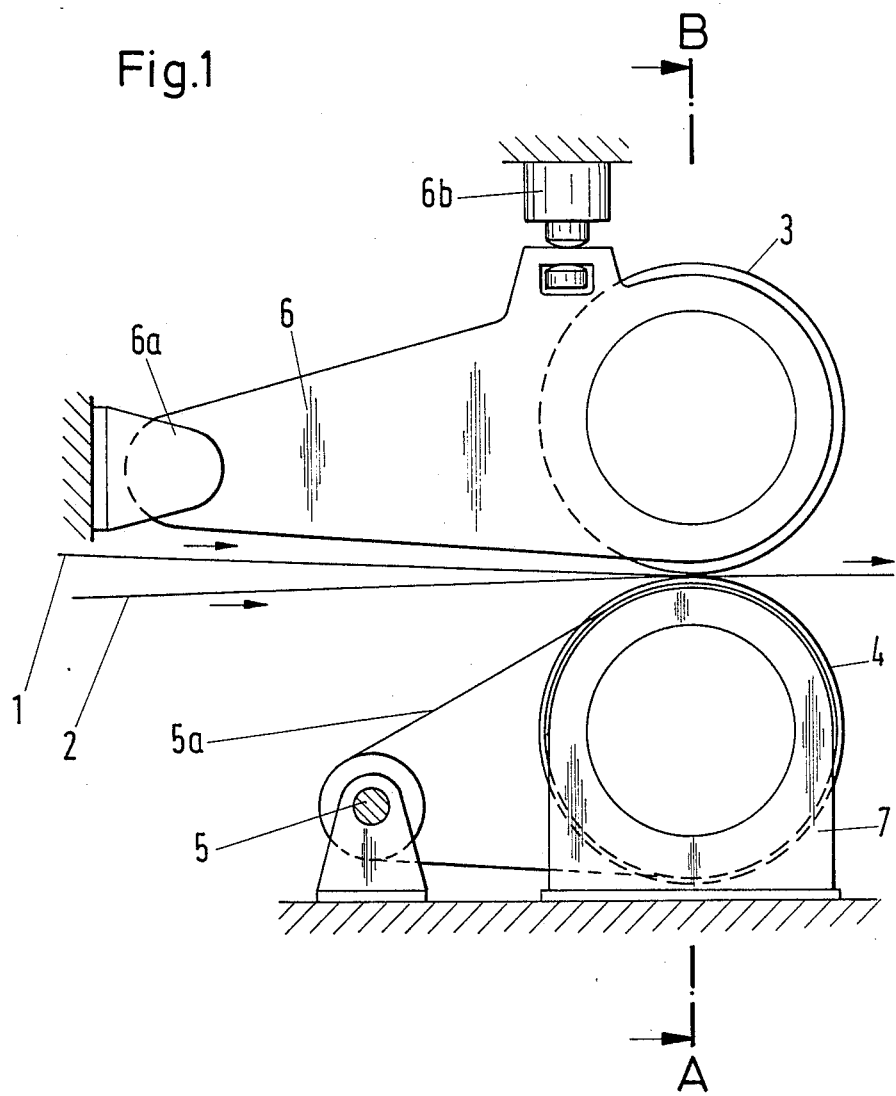
FIG. 1 shows a side elevation of a clamping device for strips to be welded in abutment.

Two strips 1, 2 to be welded to one another are so moved together at an acute angle by guide means (not shown) that their adjacent edges abut in the zone between two tension rollers 3, 4. The top tension roller 3 is mounted pivotably by means of a rocker 6 in a bearing block 6a, so that it can be adjusted vertically in relation to the bottom tension roller 4. A hydraulically actuatable height stop 6b is used for adjusting the height of the tension roller 3. While the top tension roller 3 is freely pivotably mounted, the bottom tension roller 4, mounted in a bearing block 7, is driven by a drive 5 via a belt 5a.

Figure 2:
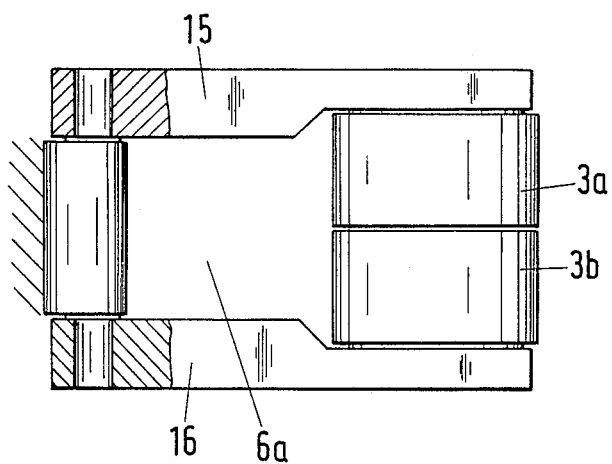
FIG. 2 shows a plan view of the clamping device shown in FIG. 1.

As shown in FIG. 2, the rocker 6 can have two independently pivotable arms 15, 16 each of which bears one half 3a, 3b of the tensioning roller 3. This allows adjustment to strips 1, 2 of different thicknesses.

Figure 3:
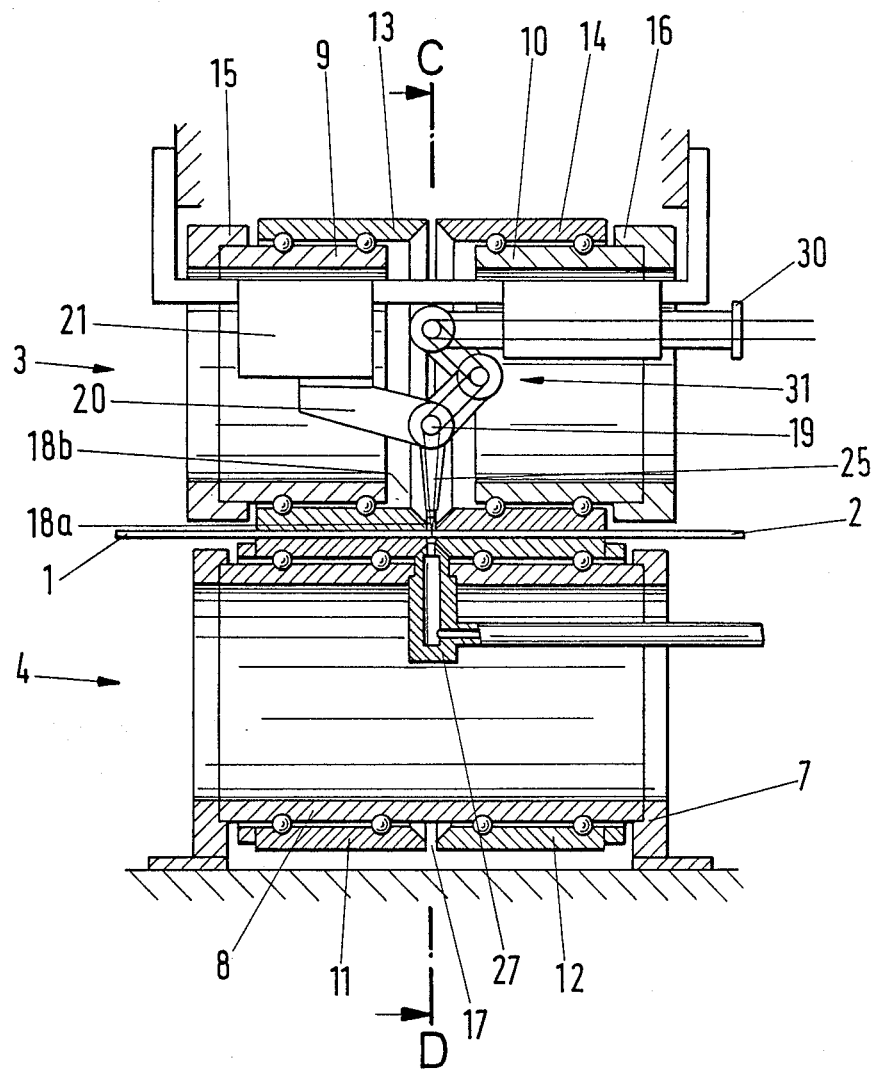
FIG. 3 shows tension rollers of the clamping device illustrated in FIG. 1 with a laser welding device, sectioned along the line A-B in FIG. 1.
Figure 4:
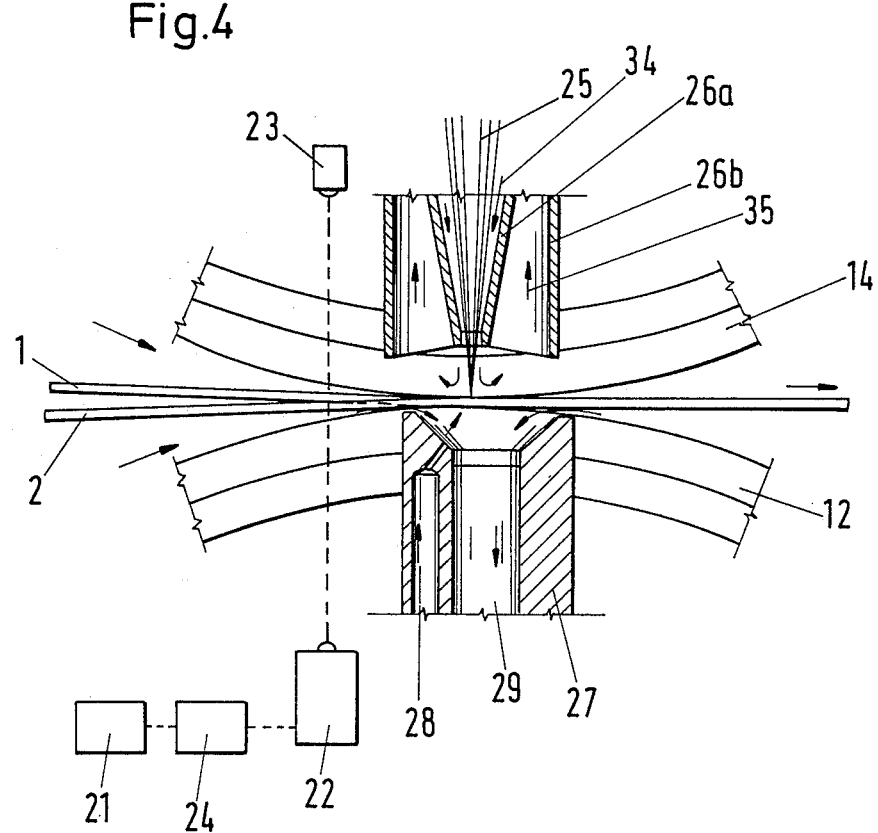
FIG. 4 shows a detail to an enlarged scale of the tension rollers shown in FIG. 3, sectioned along the line C-D in FIG. 3.

As can be gathered from FIG. 3, each tension roller 3, 4 has a hollow shaft 8, 9, 10 having roller shells 11, 12, 13, 14 mounted thereon by ball bearings. The roller shells 11, 12, 13, 14 are disposed at an axial distance from one another and therefore form between themselves a gap 17, 18a. In the zone of the gap 18a the top hollow shaft 9, 10 is divided to form a corresponding gap 18b, while the bottom hollow shaft 8 is continuous, merely having in the upper zone an aperture in which a supply device 27 for inert gas is disposed. Inert gas can be supplied to the welding place via the supply device 27 and the gap 17. As shown in FIG. 4, the supply device can have two ducts 28, 29 for the supply of the inert gas and the removal of the welding vapours.

The hollow shafts 9, 10 of the top tension roller 3 are at a relatively large axial distance. The roller shells 13, 14 overlap the hollow shafts 9, 10 so that the strip edges are clamped at a close distance from the weld point. The edges of the roller shells 13, 14 are also chamfered. This construction enables the welding head 19 to be moved close up to the weld point. Disposed in the hollow shaft 9 is an adjusting drive 21 which via a manipulator arm 20 moves the welding head 19 of a laser welding device in three axes. To control the adjusting drive, as shown in FIG. 4, for monitoring the welding gap a measuring device can be provided which can consist, for example, of a radiation source 23, more particularly a laser, and a sensor 22, more particularly a diode line camera. The signals of the sensor 22 are supplied to an evaluating device 24, which determines the size and position of the welding gap in relation to the required position and required width, and if a difference is found between the required and actual values the evaluating device 24 delivers control pulses to the adjusting drive 21, which moves the welding head 19 on correspondingly.

Figure 7:
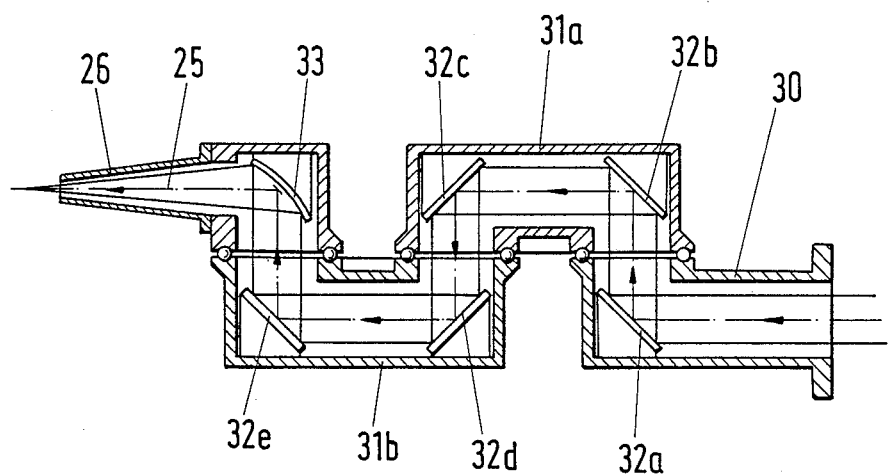
FIG. 7 shows a longitudinal section through a laser welding device.

Extending through the hollow shaft 10 is a protective tube 30 for the laser beam generated by a resonator (not shown). The protective tube 30 merges into a pivotable portion 31, which is shown merely diagrammatically in FIG. 3 and is made up of a number of joint parts 31a, 31b. FIG. 7 shows such portion with the joint parts 31a, 31b and plane-parallel deflecting mirrors 32a–32e and a focusing hollow mirror 23 in the welding head 19.

FIG. 4 shows how the laser beam is guided through the interior of two coaxial tubes 26a, 26b. Also conveyed through the inner tube 26a is a protective gas 34 which, together with the welding gases 35 evolved during welding, is removed by suction through the annular duct formed between the inner and outer tubes 26a, 26b.

Figure 5:
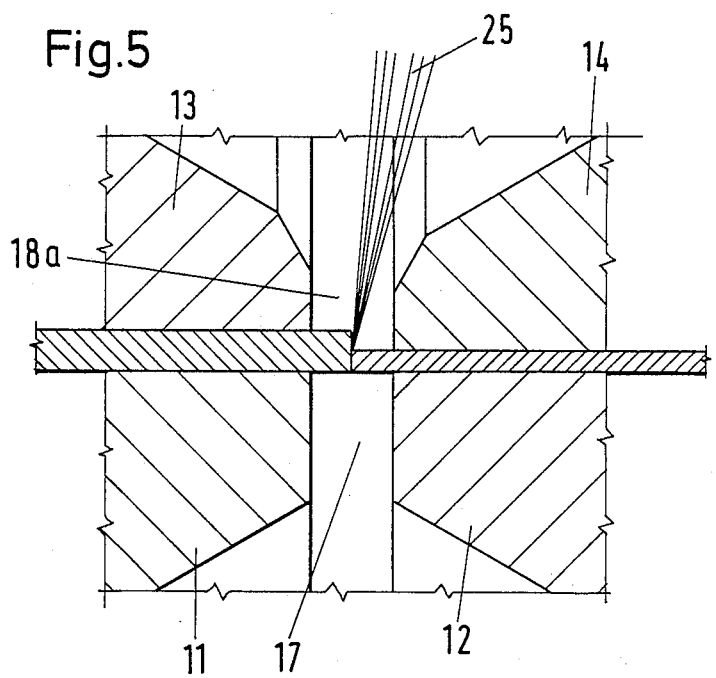
FIG. 5 shows a detail to an enlarged scale of the tension rollers of the apparatus shown in FIG. 1, sectioned along the line A-B for strips of different thicknesses.

FIG. 5 shows how with strips 1, 2 of different thicknesses the laser beam 25 is directed at an angle on the welding gap. In order that this can be done without impedance from the roller shells 13, 14 the shells 13, 14 should be chamfered.

Figure 6:
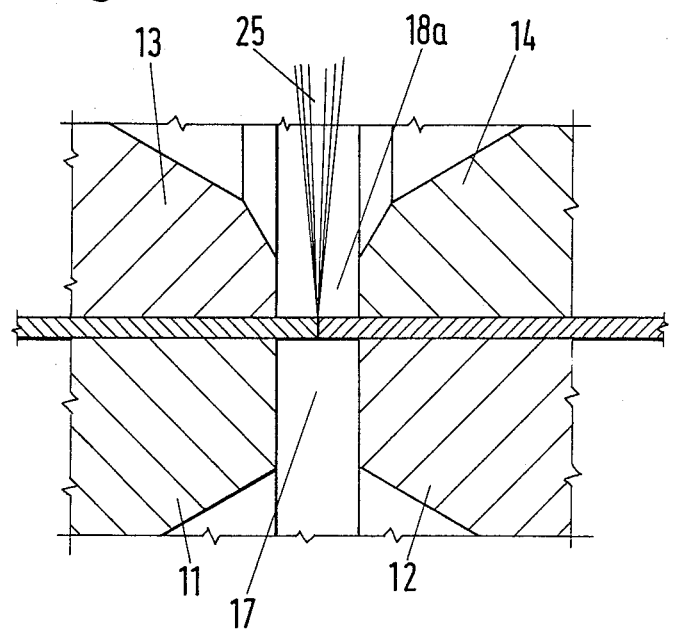
FIG. 6 shows a detail to an enlarged scale of two tension rollers of the apparatus illustrated in FIG. 1, sectioned along the line A-B, for strips of the same thickness.

During the welding of strips of equal thickness (FIG. 6), in contrast, the laser beam 25 is directed perpendicularly on to the welding gap.

What is claimed is:

1. An apparatus for the continuous welding of abutting strips or sheets comprising one or more welding heads for one or more fixed laser beams and tension rollers disposed in pairs on opposite of the strips or sheets to be welded, the axes of said tension rollers extending perpendicularly with respect to the direction of travel of the strips or sheets with the respective rollers of said pairs of rollers disposed on opposite lateral sides of an abutting line of said strips or sheets, the tension rollers comprising hollow shafts and roller shells mounted thereon and spaced out at an axial distance from one another, each welding head of the laser beam being disposed inside the hollow shaft of at least one tension roller, the laser beam passing through a gap between the roller shells and an opening in the hollow shaft.

2. An apparatus according to claim 1, wherein in the vicinity of the gap between the rollers shells the hollow shaft is divided in two parts, the gap opened thereby between the two parts of the hollow shaft forming the opening through which the laser beam passes.

3. An apparatus according to claim 1, wherein at least one welding head is disposed in each of the tension rollers disposed on opposite sides of the strips or sheets.

4. An apparatus according to claim 1, wherein a plurality of welding heads are disposed offset in relation to one another in the direction of travel of the strip or sheet in a tension roller disposed on one side of the strip or sheet.

5. An apparatus according to claim 1, wherein the tension rollers are vertically adjustably mounted.

6. An apparatus according to claim 2, wherein the tension rollers are mounted by their hollow shaft on independently movable rockers.

7. An apparatus according to claim 1, wherein the hollow shaft of one tension roller is adapted to receive a supply device for inert gas to be supplied to the gap.

8. An apparatus according to claim 1, wherein the hollow shaft of one tension roller receives a tube for the removal of welding vapors.

9. An apparatus according to claim 1, wherein the welding head moves in three coordinate directions inside the hollow shaft of one tension roller by means of a manipulator arm.

10. An apparatus according to claim 9, wherein a sensor for determining the gap in the direction of strip or sheet travel is disposed upstream of the weld point to control an adjusting drive for the manipulator arm.

* * * * *